US009414157B2

(12) United States Patent
Lou et al.

(10) Patent No.: US 9,414,157 B2
(45) Date of Patent: Aug. 9, 2016

(54) METHOD AND DEVICE FOR REDUCING VOICE REVERBERATION BASED ON DOUBLE MICROPHONES

(71) Applicant: Goertek Inc., Weifang, ShenDong Province (CN)

(72) Inventors: Shasha Lou, Weifang (CN); Bo Li, Weifang (CN); Qiuchen Huang, Weifang (CN)

(73) Assignee: Goertek, Inc., Weifang, Shandong Province (CN)

( * ) Notice: Subject to any disclaimer, the term of this patent is extended or adjusted under 35 U.S.C. 154(b) by 16 days.

(21) Appl. No.: 14/411,651

(22) PCT Filed: Dec. 12, 2013

(86) PCT No.: PCT/CN2013/001557
§ 371 (c)(1),
(2) Date: Dec. 29, 2014

(87) PCT Pub. No.: WO2014/089914
PCT Pub. Date: Jun. 19, 2014

(65) Prior Publication Data
US 2015/0189431 A1 Jul. 2, 2015

(30) Foreign Application Priority Data
Dec. 12, 2012 (CN) .......................... 2012 1 0536578

(51) Int. Cl.
*H04B 3/20* (2006.01)
*H04R 3/00* (2006.01)
(Continued)

(52) U.S. Cl.
CPC ................ *H04R 3/002* (2013.01); *G10L 21/02* (2013.01); *H04R 3/005* (2013.01); *G10L*
(Continued)

(58) Field of Classification Search
CPC ................ G10L 21/02; G10L 21/0208; G10L 2021/02082; G10L 2021/02161; G10L 2021/02165; G10L 21/0224; G10L 21/0232; G10L 21/0264
See application file for complete search history.

(56) References Cited

U.S. PATENT DOCUMENTS 6,546,099 B2 * 4/2003 Janse .................... H04M 9/082 379/406.01

FOREIGN PATENT DOCUMENTS

CN 101976565 2/2011
CN 102347028 2/2012
(Continued)

OTHER PUBLICATIONS

PCT/CN2013/001557, Written Opinion dated Mar. 11, 2014, Chinese and English Versions, 10 pages.

*Primary Examiner* — Duc Nguyen
*Assistant Examiner* — Kile Blair
(74) *Attorney, Agent, or Firm* — Boyle Fredrickson, S.C.

(57) ABSTRACT

The invention discloses a method and a device for reducing voice reverberation based on double microphones. The method comprises the steps of calculating a transfer function h(t) from a secondary microphone to a primary microphone according to an input signal $x_2(t)$ of the primary microphone and an input signal $x_1(t)$ of the secondary microphone; judging the strength of reverberation according to h(t) and calculating a regulatory factor β of a gain function by taking a tail section $h_r(t)$ of the h(t); obtaining a late reverberation estimation signal $\hat{r}(t)$ of $x_2(t)$ with the convolution of $x_1(t)$ and $h_r(t)$; calculating the gain function according to the frequency spectrum of $x_2(t)$, β and frequency spectrum of $\hat{r}(t)$; obtaining the reverberation removed frequency spectrum of $x_2(t)$ by multiplying the frequency spectrum of $x_2(t)$ by the gain function; and obtaining a late reverberation removed time-domain signal of $x_2(t)$ by frequency-time conversion. Thus, the late reverberation can be removed from the input signal of the primary microphone, early reverberation can be preserved, processed voice is not caused to be thin, and the voice quality is improved. Meanwhile, spectral subtraction intensity is adjusted according to the strength of the reverberation so as to ensure that the voice is not damaged on the condition that the reverberation is weak and the voice intelligibility is originally high. Accurate estimation of DOA of direct sound is not needed, and therefore the microphones are not required to have high consistency.

10 Claims, 8 Drawing Sheets

(51) Int. Cl.

| | |
|---|---|
| ***G10L 21/02*** | (2013.01) |
| *G10L 21/0216* | (2013.01) |
| *G10L 21/0208* | (2013.01) |

(52) U.S. Cl.

CPC ....... 2021/02082 (2013.01); *G10L 2021/02165* (2013.01); *H04R 2225/43* (2013.01); *H04R 2227/009* (2013.01)

(56) References Cited

FOREIGN PATENT DOCUMENTS

| | | |
|---|---|---|
| CN | 103087821 | 4/2013 |
| CN | 203243506 | 10/2013 |
| JP | 2012048133 | 3/2012 |

* cited by examiner

METHOD AND DEVICE FOR REDUCING VOICE REVERBERATION BASED ON DOUBLE MICROPHONES

TECHNICAL FIELD

The present invention relates to the technical field of voice enhancement, and more particularly, to a method and a device for reducing voice reverberation based on double microphones.

BACKGROUND ART

During the process of indoor propagation of sound signal, due to the sound reflection caused by hard interfaces such as walls and floors, the sounds reaching the microphone further comprise the sound signals through one or more reflections in addition to the direct sounds directly from the sound source. These non-direct sounds constitute reverberation signals. The sound signals through one or a few reflections are called early reflection signals, which constitute early reverberation signals that can enhance the voice. The sound signals through multiple reflections are called late reflection signals, which constitute late reverberation signals. Strong late reverberation will reduce the intelligibility of the voice.

In some hands-free voice communication, if the caller is far from the microphone, the voice intelligibility will be decreased due to room reverberation, resulting in poor call quality. Thus, some technique is needed to reduce reverberation and improve voice intelligibility. The signals received by a microphone comprise direct sound signals and reverberation signals. According to the foregoing, the reverberation includes early reverberation and late reverberation. It is mainly late reverberation that reduces the voice intelligibility, while early reverberation can generally enhance the voice. Therefore, the key to enhance the intelligibility is to reduce the late reverberation singals.

In various reverberation reduction techniques, the method for eliminating reverberation by spectral subtraction based on double microphones has drawn more attention. In the existing method for eliminating reverberation by spectral subtraction based on double microphones, two channels of signals are obtained using an adaptive beamforming (GSC) structure, wherein the first channel of signals are output of the delay-sum beamformer, and the second channel of signals are output of the blocking matrix. The reverberation of the first channel of signals is estimated by the energy envelopes of the two channels of signals via an adaptive filter, and then the reverberation is removed using a spectral subtraction method. This method has several disadvantages:

1) it will remove the early reverberation, and thus the processed sound will become thin;

2) it does not judge the strength of the reverberation and uses the same spectral subtraction process in different reverberation cases, which may damage the voice quality in the case of weak reverberation and higher original voice intelligibility; and 3) it requires an accurate estimation of the direction of arrival of the direct sound, so as to separate the direct sound, and thus, it requires high consistence of the microphones and strict limits to the acoustic design.

SUMMARY OF THE INVENTION

In view of the above problem, a method and a device for reducing voice reverberation based on double microphones of the present invention is provided to overcome or at least partially overcome the above problems.

According to one aspect of the present invention, a method for reducing voice reverberation based on double microphones is provided, the method comprising:

receiving a primary microphone input signal and a secondary microphone input signal, which are processed frame-by-frame as follows:

calculating a transfer function h(t) from the secondary microphone to the primary microphone according to the primary microphone input signal and the secondary microphone input signal;

obtaining a tail section $h_r(t)$ of the transfer function h(t), judging the strength of reverberation according to the transfer function h(t) and calculating a regulatory factor β of a gain function;

obtaining a late reverberation estimation signal of the primary microphone input signal with the convolution of the secondary microphone input signal and $h_r(t)$;

converting the late reverberation estimation signal of the primary microphone input signal from time domain to frequency domain to obtain a late reverberation spectrum of the primary microphone input signal; converting the primary microphone input signal from time domain to frequency domain to obtain a frequency spectrum of the primary microphone input signal;

calculating the gain function according to the frequency spectrum of the primary microphone input signal, the regulatory factor β of the gain function and the late reverberation spectrum of the primary microphone input signal;

using the frequency spectrum of the primary microphone input signal to multiply by the gain function to obtain a reverberation-removed frequency spectrum of the primary microphone input signal;

converting the reverberation-removed frequency spectrum of the primary microphone input signal from frequency domain to time domain to obtain a reverberation-removed time domain signal of the primary microphone input signal;

outputting a reverberation-removed continuous signal of the primary microphone input signal after frame-by-frame overlapping and summing the reverberation-removed time domain signal of the primary microphone input signal.

According to another aspect of the present invention, a device for reducing voice reverberation based on double microphones is provided, which frame-by-frame processes the signals received by a primary microphone and a secondary microphone, the device comprising: a reverberation spectrum estimation unit and a spectral subtraction unit, wherein:

the reverberation spectrum estimation unit is for receiving a primary microphone input signal and a secondary microphone input signal; calculating a transfer function h(t) from the secondary microphone to the primary microphone according to the primary microphone input signal and the secondary microphone input signal, obtaining a tail section $h_r(t)$ of the transfer function h(t), judging the strength of reverberation according to the transfer function h(t), calculating a regulatory factor β of a gain function to output it to the spectral subtraction unit, obtaining a late reverberation estimation signal of the primary microphone input signal with the convolution of the secondary microphone input signal and $h_r(t)$, converting the late reverberation estimation signal of the primary microphone input signal from time domain to frequency domain to obtain a late reverberation spectrum of the primary microphone input signal and output it to the spectral subtraction unit;

the spectral subtraction unit is for receiving the primary microphone input signal and the regulatory factor β of the gain function output by the reverberation spectrum estimation unit as well as the late reverberation spectrum of the primary microphone input signal, converting the primary microphone input signal from time domain to frequency domain to obtain a frequency spectrum of the primary microphone input signal, calculating the gain function according to the frequency spectrum of the primary microphone input signal, the regulatory factor β of the gain function and the late reverberation spectrum of the primary microphone input signal, using the frequency spectrum of the primary microphone input signal to multiply by the gain function to obtain a reverberation-removed frequency spectrum of the primary microphone input signal, converting the reverberation-removed frequency spectrum of the primary microphone input signal from frequency domain to time domain to obtain a reverberation-removed time domain signal of the primary microphone input signal, and outputting a reverberation-removed continuous signal of the primary microphone input signal after frame-by-frame overlapping and summing the reverberation-removed time domain signal of the primary microphone input signal.

According to the foregoing, by means of calculating a transfer function h(t) from the secondary microphone to the primary microphone according to the primary microphone input signal and the secondary microphone input signal, taking a tail section $h_r(t)$ of the transfer function h(t), judging the strength of reverberation according to the transfer function h(t), calculating a regulatory factor β of the gain function; and obtaining a late reverberation estimation signal of the primary microphone input signal with the convolution of the secondary microphone input signal and $h_r(t)$, calculating the gain function according to the frequency spectrum of the primary microphone input signal, the regulatory factor of the gain function and the late reverberation spectrum of the primary microphone input signal, and using the frequency spectrum of the primary microphone input signal to multiply by the gain function to obtain a reverberation-removed frequency spectrum of the primary microphone input signal, namely, subtracting the late reverberation estimation spectrum of the primary microphone input signal from the frequency spectrum of the primary microphone input signal by spectral subtraction method, the present invention can effectively remove from the primary microphone input signal its late reverberation while retaining its early reverberation, without resulting in thinness of the processed sound, thereby improving the voice quality. Meanwhile, in the estimation of late reverberation, the intensity of spectral subtraction is adjusted according to the strength of the reverberation, less or even no spectral subtraction is made when the reverberation is weak, which ensures that the voice is not damaged on the condition that the reverberation is weak and the voice intelligibility is originally high. In addition, this scheme does not require accurate estimation of DOA (Direction Of Arrival) of direct sound, and therefore, it does not require the microphones to have high consistency, and the acoustic design is not strictly limited.

Figure 8:
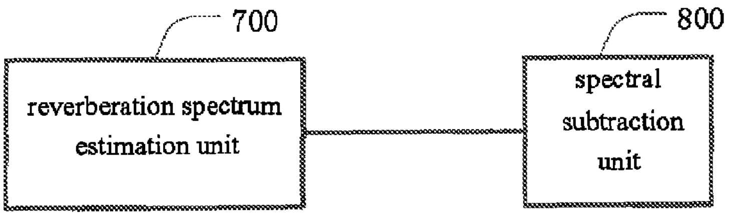
Figure 9:
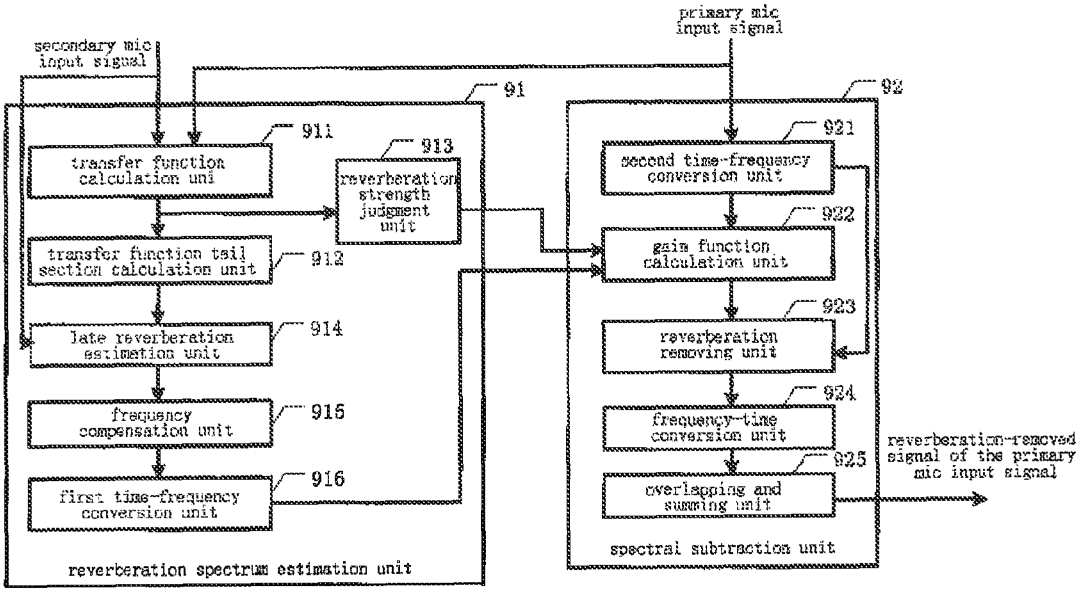

FIG. **5*a*** is a schematic diagram showing a transfer function from a secondary microphone to a primary microphone when the distance from the sound source to the primary microphone is 0.5 m in an embodiment of the present invention;

FIG. **5*b*** is a schematic diagram showing a transfer function from a secondary microphone to a primary microphone when the distance from the sound source to the primary microphone is 1 m in an embodiment of the present invention;

FIG. **5*c*** is a schematic diagram showing a transfer function from a secondary microphone to a primary microphone when the distance from the sound source to the primary microphone is 2 m in an embodiment of the present invention;

FIG. **5*d*** is a schematic diagram showing a transfer function from a secondary microphone to a primary microphone when the distance from the sound source to the primary microphone is 4 m in an embodiment of the present invention;

FIG. **6*a*** is a schematic diagram showing the amplitude-frequency characteristics of the frequency compensation filter when the distance between the primary and secondary microphones is 6 cm in an embodiment of the present invention;

FIG. **6*b*** is a schematic diagram showing the amplitude-frequency characteristics of the frequency compensation filter when the distance between the primary and secondary microphones is 18 cm in an embodiment of the present invention;

FIG. **7*a*** is a diagram showing the time domain of the primary microphone input signal in an embodiment of the present invention;

FIG. **7*b*** is a diagram showing the time domain of the primary microphone after removal of reverberation in an embodiment of the present invention;

FIG. **7*c*** is a diagram showing the speech spectrum of the primary microphone input signal in an embodiment of the present invention;

FIG. **7*d*** is a diagram showing the speech spectrum of the primary microphone after removal of reverberation in an embodiment of the present invention;

FIG. 8 is a diagram showing the composition and structure of a device for reducing voice reverberation based on double microphones in an embodiment of the present invention; and FIG. 9 is a schematic diagram showing the detailed composition and structure of a device for reducing voice reverberation based on double microphones and the input and output thereof in a preferred embodiment of the present invention.

DETAILED DESCRIPTION OF THE INVENTION

First of all, it is needed to declare that: to make the application documents briefly, “microphone” is referred to as “mic” in the present application documents.

According to the analysis of the prior art, in order to better reduce reverberation, the direct sound and early reverberation need to be protected while removing late reverberation, and therefore, the estimation of late reverberation and the judgment of reverberation strength need to be accurate and stable.

The present invention proposes a scheme of removing reverberation based on double mics, which makes full use of the approximate relationship between the reverberation and the spatial transfer function between double mics, estimates the late reverberation and judges the strength of the reverberation using the spatial transfer function between double mics, thereby obtaining the nearly optimum voice quality with the cooperation of a spectral subtraction module in a variety of reverberation circumstances while satisfying the intelligibility. In addition, neither separation of direct sound nor DOA estimation is required in the scheme of the present invention, so it does not require consistency in mics and thus relaxes acoustic design.

The basic principle of the present invention is: to estimate late reverberation through the tail section of the transfer function between the double mics, thus, the direct sound and early reverberation can be retained better in the spectral subtraction. In addition, when estimating the late reverberation, the energy difference between the head section and the tail section of the transfer function between the double mics is further used to estimate the degree of reverberation in a room so as to adjust the intensity of spectral subtraction; and when the reverberation is weak, less or even no spectral subtraction is made so as to protect voice quality.

To make the technical scheme of the present invention clearer, the technical principles of the present invention is analyzed in below.

Figure 1:
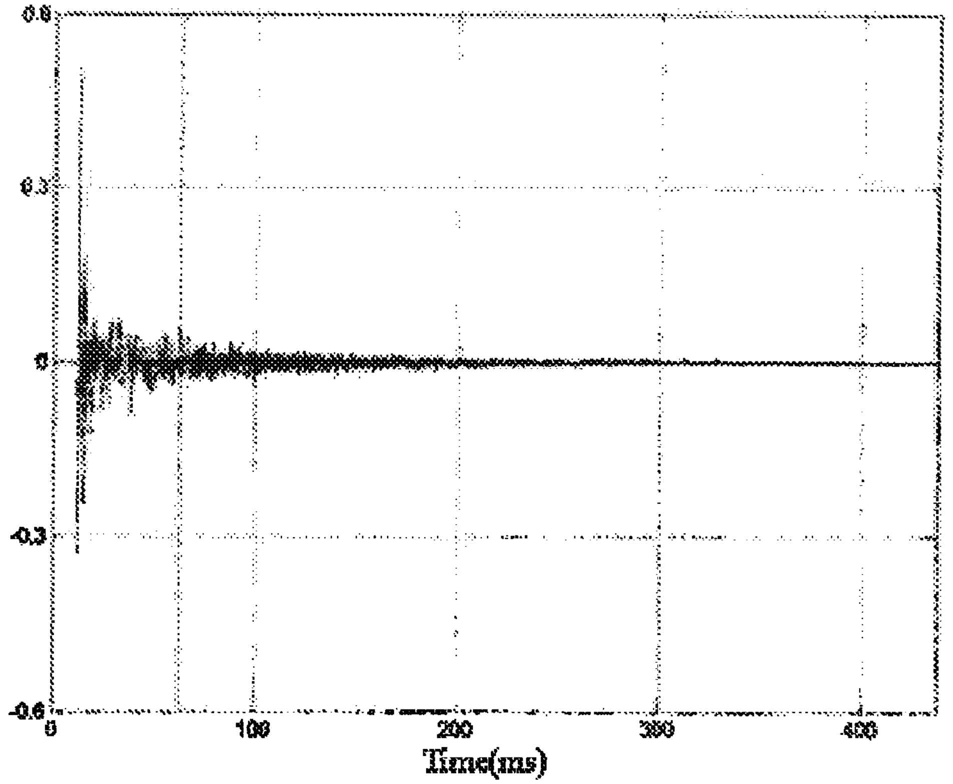
FIG. 1 is a schematic diagram showing a transfer function from an excitation signal to a microphone input signal in an embodiment of the present invention.

The early reverberation signal can enhance the voice, while the late reverberation will reduce voice intelligibility. FIG. 1 is a schematic diagram showing a transfer function from an excitation signal to a mic input signal in an embodiment of the present invention. Referring to FIG. 1, on the transfer function from an excitation signal to a mic input signal, the maximum peak value corresponds to a direct sound. Generally, a point having a distance from the maximum peak is regarded as a boundary point between early reflection and late reflection, the portion from the maximum peak to the boundary point corresponds to early reverberation, and the portion after the boundary point corresponds to late reverberation. In FIG. 1, the boundary point is 50 ms.

If the excitation signal is recorded as s(t), the mic input signal is recorded as x(t), the transfer function from the excitation signal to the mic input signal is recorded as tf(t), the transfer function corresponding to the direct sound and early reverberation portion is recorded as $tf_d(t)$, and the transfer function corresponding to the late reverberation portion is recorded as $tf_r(t)$ the mic input signal can be expressed as a convolution of the excitation signal and the transfer function, i.e., x(t)=s(t)*tf(t), the direct sound and early reverberation component of the mic input signal can be expressed as $x_d(t)=s(t)*tf_d(t)$, and the late reverberation component of the mic input signal can be expressed as $x_r(t)=s(t)*tf_r(t)$. Thus, the mic input signal can also be expressed as $x(t)=s(t)*tf(t)=s(t)*(tf_d(t)+tf_r(t))=x_d(t)+x_r(t)$.

The voice intelligibility can be represented using $C_{50}$, which is calculated as:

$$C_{50} = 10\log\frac{\int_0^{50\ ms} w^2(t)\,dt}{\int_{50\ ms}^{\infty} w^2(t)\,dt}\text{dB} \tag{1}$$

where w(t) is the transfer function from the excitation signal to the mic input signal. The transfer function in 0~50 ms corresponds to direct sound and early reverberation portion, the transfer function after 50 ms corresponds to late reverberation portion. The stronger the reverberation is, the smaller the value of $C_{50}$ is. The enhancement of $C_{50}$ upon the removal of reverberation can reflect the effect of the removal of reverberation. Thus, $C_{50}$ can be used as an indicator for objectively evaluating the removal of reverberation.

Figure 2:
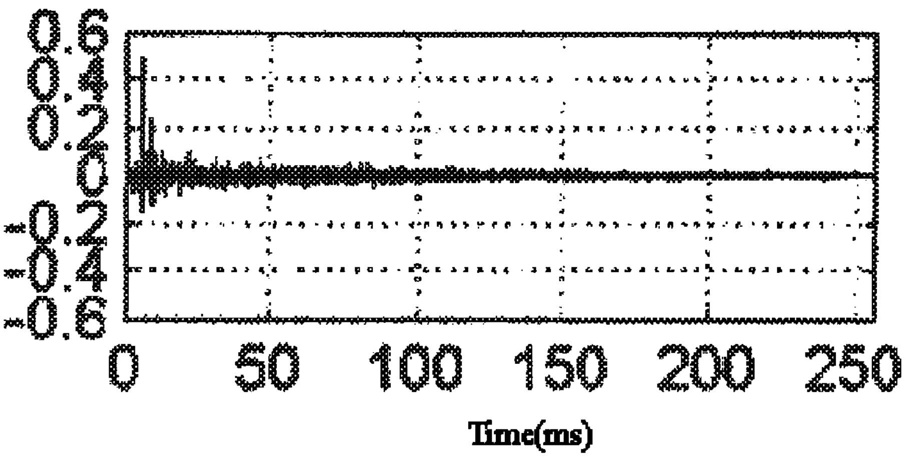
FIG. 2 is a schematic diagram showing a transfer function from a secondary microphone to a primary microphone in an embodiment of the present invention.

In the present invention, the principle for reverberation estimation based on double mics (a primary mic and a secondary mic) is as follows: the input signal of the primary mic is recorded as $x_2(t)$, the input signal of the secondary mic is recorded as $x_1(t)$, the transfer function from the secondary mic to the primary mic is recorded as h(t), as shown in FIG. 2. FIG. 2 is a schematic diagram showing a transfer function h(t) from a secondary mic to a primary mic in an embodiment of the present invention.

The input signal $x_2(t)$ of the primary mic is equal to the convolution of the input signal $x_1(t)$ of the secondary mic and the transfer function h(t):

$$x_2(t)=x_1(t)*h(t) \tag{2}$$

h(t) can be divided into a head section and a tail section:

$$h(t)=h_d(t)+h_r(t) \tag{3}$$

where $h_d(t)$ represents the head section of h(t), and $h_r(t)$ represents the tail section of h(t).

The tail section $h_r(t)$ of h(t) reflects the multiple spatial reflections of a signal, so the convolution signal $\hat{r}(t)$ of the tail section $h_r(t)$ of h(t) and the secondary mic input signal $x_1(t)$ is similar to the late reverberation component of the primary mic, and can be used as an estimation signal of the late reverberation component of the primary mic. A point is selected on h(t) as a boundary point between $h_d(t)$ and $h_r(t)$, and the values of h(t) before the boundary point is set to 0, $h_r(t)$ can be obtained. The range of the distance from the boundary point to the maximum peak of h(t) can be set to be 30 ms~80 ms (experience values). According to experience, if the distance from the boundary point to the maximum peak of h(t) is greater than or equal to 50 ms, the late reverberation estimation signal $\hat{r}(t)$ of the primary mic does not have direct sound and residual of the early reflection component at all, which can reduce the damage to voice. Therefore, in the embodiments of the present invention, 50 ms is taken as the boundary point as example for description.

To make the object, technical scheme and advantages of the present invention clearer, the embodiments of the present application are described in further detail with reference to the drawings.

Figure 3:
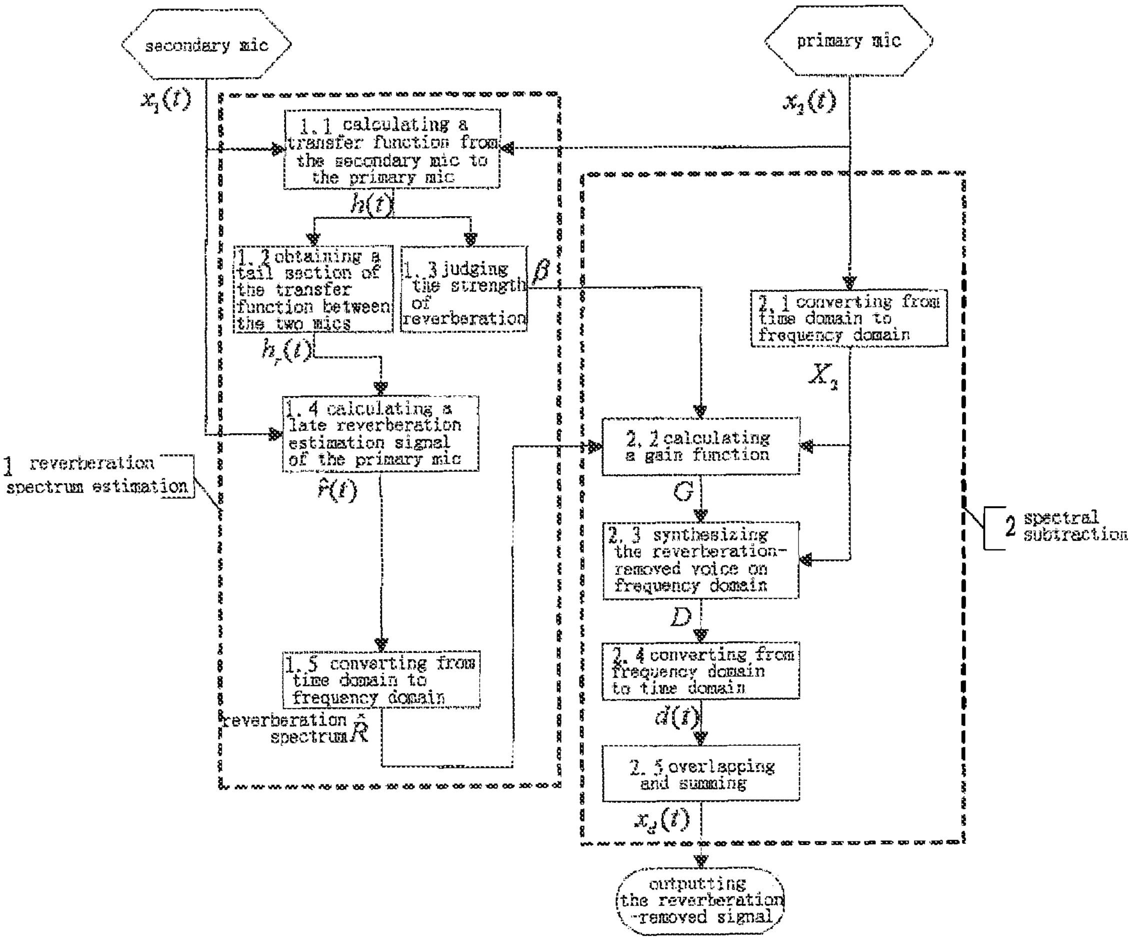
FIG. 3 is a schematic flow diagram showing a method for reducing voice reverberation based on double microphones in an embodiment of the present invention.

FIG. 3 is a schematic flow diagram showing a method for reducing voice reverberation based on double mics in an embodiment of the present invention. As shown in FIG. 3, the method mainly comprises a section of reverberation estimation and a section of spectral subtraction, which is specifically processed frame-by-frame as follows:

1.1, receiving a primary mic input signal $x_2(t)$ and a secondary mic input signal $x_1(t)$, calculating a transfer function h(t) from the secondary mic to the primary mic according to the primary mic input signal and the secondary mic input signal;

1.2, obtaining a tail section $h_r(t)$ of the transfer function h(t);

1.3, judging the strength of reverberation according to the transfer function h(t), and calculating a regulatory factor β of a gain function;

1.4, obtaining a late reverberation estimation signal $\hat{r}(t)$ of the primary mic input signal with the convolution of the secondary mic input signal and $h_r(t)$;

1.5, converting the late reverberation estimation signal $\hat{r}(t)$ of the primary mic input signal from time domain to frequency domain to obtain a late reverberation spectrum $\hat{R}$ of the primary mic input signal;

2.1, converting the primary mic input signal $x_2(t)$ from time domain to frequency domain to obtain a frequency spectrum $X_2$ of the primary mic input signal;

2.2, calculating a gain function G according to the frequency spectrum $X_2$ of the primary mic input signal, the regulatory factor β of the gain function and the late reverberation spectrum $\hat{R}$ of the primary mic input signal;

2.3, using the frequency spectrum $X_2$ of the primary mic input signal to multiply by the gain function G to obtain a reverberation-removed frequency spectrum D of the primary mic input signal;

2.4, converting the reverberation-removed frequency spectrum D of the primary mic input signal from frequency domain to time domain to obtain a reverberation-removed time domain signal d(t) of the primary mic input signal;

2.5, outputting a reverberation-removed continuous signal $x_d(t)$ of the primary mic input signal after frame-by-frame overlapping and summing the reverberation-removed time domain signal of the primary mic input signal.

In the method shown in FIG. 3, by means of obtaining a late reverberation estimation signal of the primary mic input signal with the convolution of the secondary mic input signal and $h_r(t)$, and then subtracting the late reverberation estimation spectrum of the primary mic input signal from the frequency spectrum of the primary mic input signal by spectral subtraction method, the late reverberation can be effectively removed from the input signal of the primary mic while retaining its early reverberation, which improves the voice quality. Meanwhile, in the scheme shown in FIG. 3, in the estimation of late reverberation, the intensity of spectral subtraction is adjusted according to the strength of the reverberation, less or even no spectral subtraction is made when the reverberation is weak, which ensures that the voice quality is protected from damage on the condition that the reverberation is weak and the voice intelligibility is originally high. In addition, this scheme does not require accurate estimation of DOA of direct sound, and therefore, it does not require the mics to have high consistency, and the acoustic design is not strictly limited.

In one embodiment of the present invention, on the basis of the scheme shown in FIG. 3, it is further considered that compared with the real late reverberation component of the primary mic input signal, the late reverberation estimation signal of the primary mic input signal has the problem of underestimation in the low frequency portion, and thus a low-pass filter is designed according to different distances between mics to correspondingly frequency compensate the late reverberation estimation signal. See the embodiment shown in FIG. 4 for detail.

Figure 4:
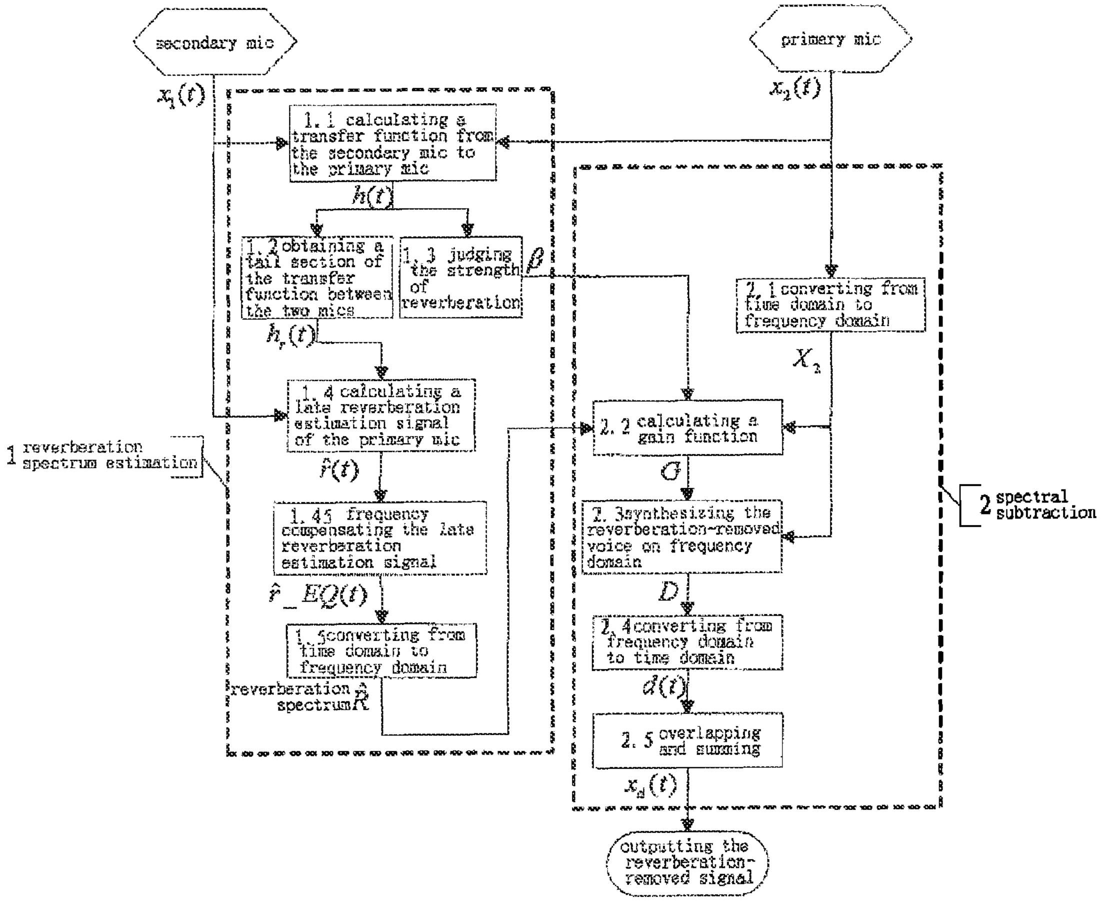
FIG. 4 is an overall schematic flow diagram showing a method for reducing voice reverberation based on double microphones in another embodiment of the present invention.

FIG. 4 is an overall schematic flow diagram showing a method for reducing voice reverberation based on double mics in another embodiment of the present invention. As shown in FIG. 4, the input of the entire system is a secondary mic input signal $x_1(t)$ and a primary mic input signal $x_2(t)$, and the output is reverberation-removed signal $x_d(t)$. Two parts are included: a reverberation spectrum estimation process and a spectral subtraction process. Compared with the method shown in FIG. 3, a step of frequency compensation to the late reverberation estimation signal is added into FIG. 4 (in FIG. 4, the step of frequency compensation to the late reverberation estimation signal is step 1.45, and the step of time-frequency domain conversion is stilled marked as step 1.5). In the following, this method is described in detail with reference to FIG. 4.

1. Reverberation Spectrum Estimation

Input: input signal $x_1(t)$ of the secondary mic, and input signal $x_2(t)$ of the primary mic;

Output: regulatory factor β of the gain function (as an input of the spectral subtraction process), and late reverberation spectrum $\hat{R}$ of the primary mic input signal (as an input of the spectral subtraction process);

Reverberation spectrum estimation includes six steps: 1.1, 1.2, 1.3, 1.4, 1.45 and 1.5.

2. Spectral Subtraction

Input: input signal $x_2(t)$ of the primary mic, regulatory factor β of the gain function (an output in the reverberation spectrum estimation process), and late reverberation spectrum $\hat{R}$ of the primary mic (an output in the reverberation spectrum estimation process);

Output: reverberation-removed signal $x_d(t)$ of the primary mic input signal (also an output of the entire system);

The spectral subtraction process includes five steps: 2.1, 2.2, 2.3, 2.4 and 2.5.

In the following, each step and relationship between steps in the reverberation spectral estimation process and spectrum subtraction process will be explained in detail.

1. Reverberation Spectrum Estimation Process:

1.1 Calculating the Transfer Function h(t) from the Secondary Mic to the Primary Mic Input of 1.1: input signal $x_2(t)$ of the secondary mic and input signal $x_2(t)$ of the primary mic.

Output of 1.1: transfer function h(t) from the secondary mic to the primary mic (as input of 1.2).

In one embodiment of the present invention, transfer function H is calculated using the cross power spectrum $P_{x2x1}$ of the secondary mic input signal $x_1(t)$ and the primary mic input signal $x_2(t)$ and the power spectrum $P_{x1x1}$ of the secondary mic input signal $x_1(t)$:

$$H = \frac{P_{x_2x_1}}{P_{x_1x_1}} \tag{4}$$

The transfer function H of the frequency domain is transferred by inverse Fourier transform, so the transfer function h(t) of the time domain is obtained.

In other embodiments the present invention, h(t) can be calculated by different methods such as adaptive filtering method, etc., and it is not described in detail.

1.2 Acquiring a Tail Section $h_r(t)$ of the Transfer Function h(t)

Input of 1.2: transfer function h(t) from the secondary mic to the primary mic (output of 1.1).

Output of 1.2: tail section $h_r(t)$ of the transfer function from the secondary mic to the primary mic (as input of 1.4).

In an embodiment of the present invention, a boundary point between the early reverberation and the late reverberation is taken from the time axis of the transfer function h(t). The value of the transfer function h(t) before the boundary point is set to be 0, and then tail section $h_r(t)$ of the transfer function h(t) is obtained. In a preferred embodiment of the present invention, a point is selected from h(t), the distance from this point to the maximum peak of h(t) is set to be 50 ms, and the value of h(t) before this point is set to be 0 and recorded as $h_r(t)$.

1.3 Judging the Strength of the Reverberation According to the Transfer Function h(t) from the Secondary Mic to the Primary Mic and Calculating a Regulatory Factor β of the Gain Function.

Input of 1.3: transfer function h(t) from the secondary mic to the primary mic (output of 1.1).

Output of 1.3: regulatory factor β of the gain function (as an input of the spectral subtraction process).

In order to reduce the damage to the voice caused by removal of reverberation when the reverberation is weak, in step 1.3, the regulatory factor β of the gain function is calculated by judging the strength of the reverberation. In an embodiment of the present invention, logarithm is taken of the ratio of the energy of the head section of the transfer function from the secondary mic to the primary mic to the energy of the tail section, which is recorded as ρ:

$$\rho = 10\log\frac{\int_0^T h^2(t)\,dt}{\int_T^\infty h^2(t)\,dt}\,\mathrm{dB} \tag{5}$$

where h(t) is the transfer function from the secondary mic to the primary mic, and T is the designated boundary point on the time axis of h(t). This boundary point T is not necessarily a boundary point between the early reverberation and the late reverberation, but the portion before the boundary point T must include direct sound and may also include some or all of the early reverberation.

Figure 5A:
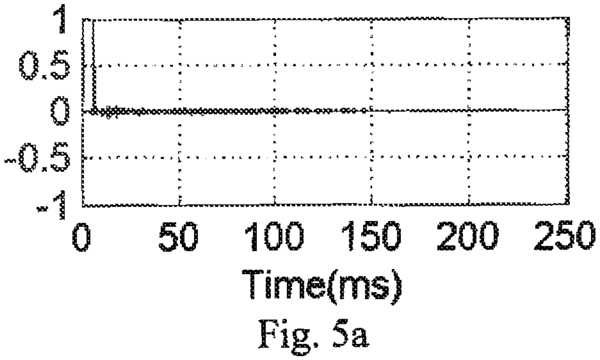

FIG. 5*a* is a schematic diagram showing a transfer function from a secondary mic to a primary mic when the distance from the sound source to the primary mic is 0.5 m in an embodiment of the present invention. When the distance from the sound source to the primary mic L=0.5 m, the value of T ranges from 20 ms to 50 ms. Here, the voice intelligibility index $C_{50}$=12.3 dB, ρ=9.4 dB when T is taken as 50 ms (i.e., the boundary point T is the time point having a distance of 50 ms to the maximum peak of h(t)).

Figure 5B:
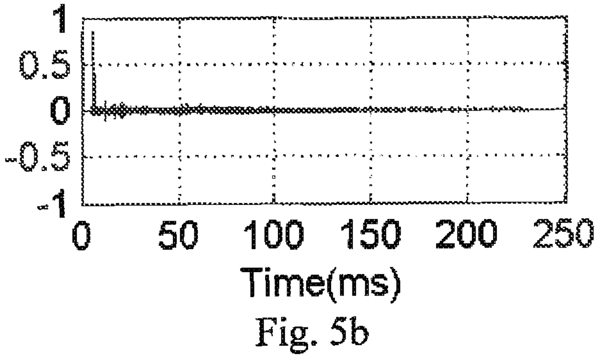

FIG. 5*b* is a schematic diagram showing a transfer function from a secondary mic to a primary mic when the distance from the sound source to the primary mic is 1 m in an embodiment of the present invention. When the distance from the sound source to the primary mic L=1 m, the value of T ranges from 20 ms to 50 ms. Here, the voice intelligibility index $C_{50}$=8.1 dB, ρ=6.0 dB when T is taken as 50 ms (i.e., the boundary point T is the time point having a distance of 50 ms to the maximum peak of h(t)).

Figure 5C:
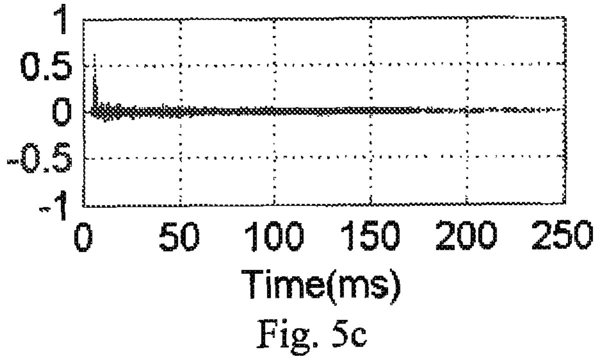

FIG. 5*c* is a schematic diagram showing a transfer function from a secondary mic to a primary mic when the distance from the sound source to the primary mic is 2 m in an embodiment of the present invention. When the distance from the sound source to the primary mic L=2 m, the value of T ranges from 20 ms to 50 ms. Here, the voice intelligibility index $C_{50}$=5.4 dB, ρ=3.7 dB when T is taken as 50 ms (i.e., the boundary point T is the time point having a distance of 50 ms to the maximum peak of h(t)).

Figure 5D:
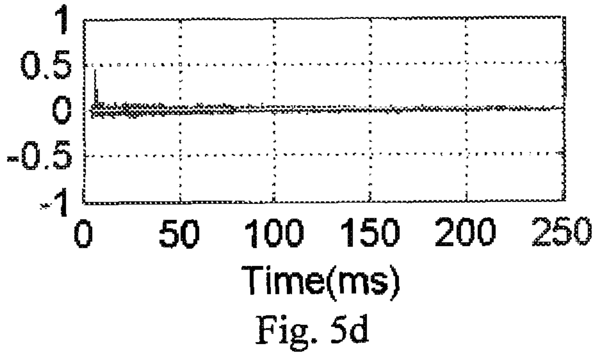

FIG. 5*d* is a schematic diagram showing a transfer function from a secondary mic to a primary mic when the distance from the sound source to the primary mic is 4 m in an embodiment of the present invention. When the distance from the sound source to the primary mic L=4 m, the value of T ranges from 20 ms to 50 ms. Here, the voice intelligibility index $C_{50}$=4.5 dB, ρ=2.2 dB when T is taken as 50 ms (i.e., the boundary point T is the time point having a distance of 50 ms to the maximum peak of h(t)).

The farther the sound source is away from the mic, the stronger the reverberation is. FIGS. 5*a* to 5*d* show that the energy of the head section of the transfer function from the secondary mic to the primary mic becomes lower while the energy of the tail section becomes higher. The logarithm ρ of the ratio of the head section and the tail section can reflect the strength of the reverberation. As the reverberation becomes stronger, the value of ρ becomes smaller. Therefore, the strength of the reverberation can be judged according to the value of $\rho_1$, and thus the regulatory factor β of the gain function can be calculated.

β can be calculated by many ways. Formula (6) is an empirical formula for calculating β in an embodiment of the present invention:

$$\beta = \begin{cases} 0 & \rho > \rho_1 \\ 2(\rho_1 - \rho)/(\rho_1 - \rho_2) & \rho_2 < \rho < \rho_1 \\ 2 & \rho < \rho_2 \end{cases} \tag{6}$$

$\rho_1$ and $\rho_2$ are predetermined values and empirical values. In the embodiment of the present invention, $\rho_1$ is 9 dB, and $\rho_2$ is 2 dB (the distance between mics is 6 cm).

1.4 Obtaining a Late Reverberation Estimation Signal $\hat{r}(t)$ of the Primary Mic Input Signal with the Convolution of the Secondary Mic Input Signal $x_1(t)$ and the Tail Section $h_r(t)$ of the Transfer Function from the Secondary Mic to the Primary Mic.

Input of 1.4: secondary mic input signal $x_1(t)$, and tail section $h_r(t)$ of the transfer function from the secondary mic to the primary mic (output of 1.2).

Output of 1.4: late reverberation estimation signal $\hat{r}(t)$ of the primary mic input signal (as input of 1.45).

To be specific, the formula is:

$$\hat{r}(t) = x_1(t) * h_r(t) \tag{7}$$

1.45 Frequency Compensating the Late Reverberation Estimation Signal $\hat{r}(t)$ of the Primary Mic Input Signal to Obtain the Compensated Signal $\hat{r}$_EQ(t).

Input of 1.45: late reverberation estimation signal $\hat{r}(t)$ of the primary mic input signal (output of 1.4).

Output of 1.45: frequency compensated late reverberation estimation signal $\hat{r}$_EQ(t) of the primary mic input signal (as input of 1.5)

Compared with the real late reverberation component of the primary mic input signal, the late reverberation estimation signal $\hat{r}(t)$ of the primary mic input signal is underestimated in the low frequency portion. Thus, in the present invention, the late reverberation estimation signal $\hat{r}(t)$ of the primary mic input signal is frequency compensated. The distance between the primary and secondary mics will affect the late reverberation estimation signal $\hat{r}(t)$. Therefore, in the embodiment of the present invention, a low-pass filter is designed according to the different distances between mics to correspondingly frequency compensate the late reverberation estimation signal, thereby obtaining the compensated late reverberation estimation signal $\hat{r}$_EQ(t).

Figure 6A:
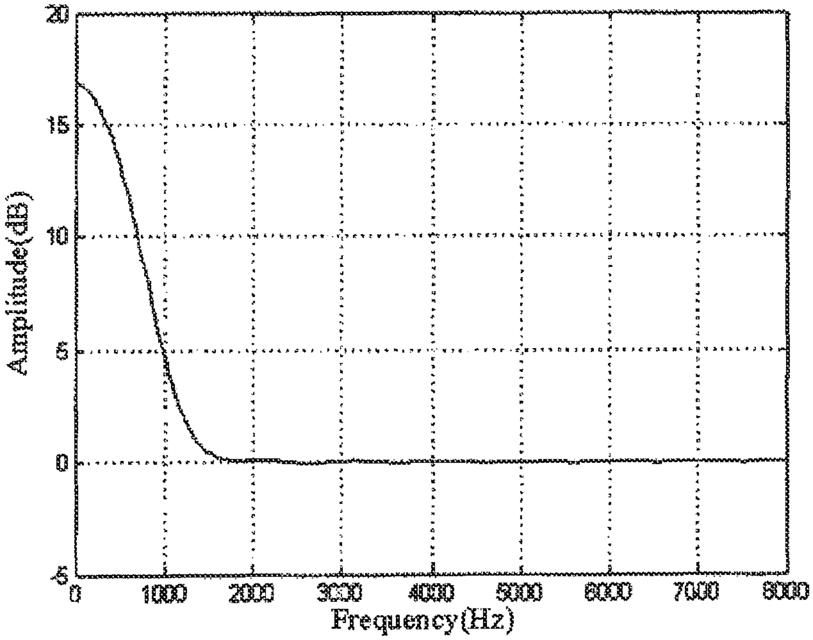
Figure 6B:
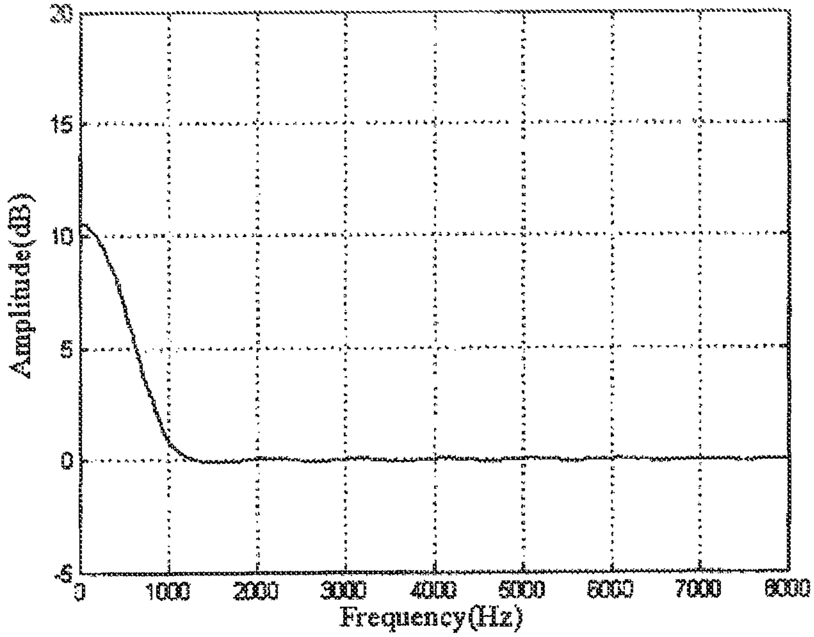

FIG. 6*a* is a schematic diagram showing the amplitude-frequency characteristics of the frequency compensation filter when the distance between the primary and secondary mics is 6 cm in an embodiment of the present invention. FIG. 6*b* is a schematic diagram showing the amplitude-frequency characteristics of the frequency compensation filter when the distance between the primary and secondary mics is 18 cm in an embodiment of the present invention. As can be seen, in the embodiment of the present invention, the greater the distance between the primary mic and the secondary mic is, the less the degree of frequency compensation to the low frequency portion of the late reverberation estimation signal $\hat{r}(t)$ of the primary mic input signal is.

1.5 Converting the Frequency Compensated Late Reverberation Estimation Signal $\hat{r}$_EQ(t) of the Primary Mic Input Signal from Time Domain to Frequency Domain to Obtain a Late Reverberation Spectrum $\hat{R}$ of the Primary Mic Input Signal.

Input of 1.5: frequency compensated late reverberation estimation signal $\hat{r}$_EQ(t) of the primary mic input signal (output of 1.45).

Output of 1.5: late reverberation spectrum $\hat{R}$ of the primary mic input signal (as an input of the spectral subtraction process).

By converting the frequency compensated late reverberation estimation signal $\hat{r}$_EQ(t) of the primary mic to frequency domain, a late reverberation spectrum $\hat{R}$ of the primary mic input signal can be obtained:

$$\hat{R}=fft(\hat{r}\_EQ(t)) \quad (8)$$

2. Spectral Subtraction Process 2.1 Converting the Input Signal $x_2(t)$ of the Primary Mic from Time Domain to Frequency Domain, which is Recorded as $X_2$.

Input of 2.1: input signal $x_2(t)$ of the primary mic.

Output of 2.1: frequency spectrum $X_2$ of the primary mic input signal (as input of 2.2).

The specific formula is as follows:

$$X_2=fft(x_2(t)) \quad (9)$$

2.2 Calculating a Gain Function G According to the Frequency Spectrum $X_2$ of the Primary Mic Input Signal and the Estimated Late Reverberation Spectrum $\hat{R}$ of the Primary Mic, and Regulating the Gain Function According to the Regulatory Factor β.

Input of 2.2: frequency spectrum $X_2$ of the primary mic input signal (output of 2.1), late reverberation spectrum $\hat{R}$ of the primary mic (output of 1.5 in the reverberation spectrum estimation process), regulatory factor β of the gain function (output of 1.3 in the reverberation spectrum estimation process).

Output of 2.2: gain function G (as an input of 2.3)

In an embodiment of the present invention, gain function G(l,k) is calculated using power spectral subtraction method according to the following formula:

$$G(l,k)=\sqrt{\frac{|X_2(l,k)|^2-\beta|\hat{R}(l,k)|^2}{|X_2(l,k)|^2}} \quad (10)$$

where l is frame number, k is frequency point number, β is regulatory factor of the gain function, $\hat{R}$ is late reverberation spectrum of the primary mic input signal, and $X_2$ is frequency spectrum of the primary mic input signal.

According to the formula (10), gain function G(l,k) can be regulated by the regulatory factor β of the gain function. Thus, less or even no spectral subtraction is made when the reverberation is weak, which ensures that the voice will not be damaged and the voice quality is protected on the condition that the reverberation is weak and the voice intelligibility is originally high.

2.3 Obtaining Reverberation-Removed Frequency Spectrum D of the Primary Mic Input Signal by Multiplying the Amplitude Spectrum $|X_2|$ of the Primary Mic Input Signal by the Gain Function G in Combination with the Phase of the Primary Mic Input Signal.

Input of 2.3: frequency spectrum $X_2$ of the primary mic input signal (output of 2.1), and gain function G (output of 2.2).

Output of 2.3: reverberation-removed frequency spectrum D of the primary mic input signal (as input of 2.4).

To be specific, the reverberation-removed frequency spectrum D(l,k) of the primary mic input signal is calculated by the following formula:

$$D(l,k)=G(l,k)\cdot|X_2(l,k)|\cdot\exp(j\cdot\text{phase}(l,k)) \quad (11)$$

where l is frame number, k is frequency point number, $|X_2(l,k)|$ is amplitude spectrum of the primary mic input signal, G(l,k) is gain function, and phase(l,k) is phase of the primary mic input signal.

2.4 Converting the Reverberation-Removed Frequency Spectrum D of the Primary Mic Input Signal to Time Domain, and Recording it as d(t).

Input of 2.4: reverberation-removed frequency spectrum D of the primary mic input signal (output of 2.3).

Output of 2.4: reverberation-removed time domain signal d(t) of the primary mic input signal (as input of 2.5).

$$d(t)=ifft(D) \quad (12)$$

2.5 Obtaining a Reverberation-Removed Continuous Signal $x_d(t)$ of the Primary Mic Input Signal by Frame-by-Frame Overlapping and Summing the Reverberation-Removed Time Domain Signal of the Primary Mic Input Signal.

Input of 2.5: reverberation-removed time domain signal d(t) of the primary mic input signal (output of 2.4).

Output of 2.5: reverberation-removed continuous signal $x_d(t)$ of the primary mic input signal (output of the entire system).

Figure 7A:
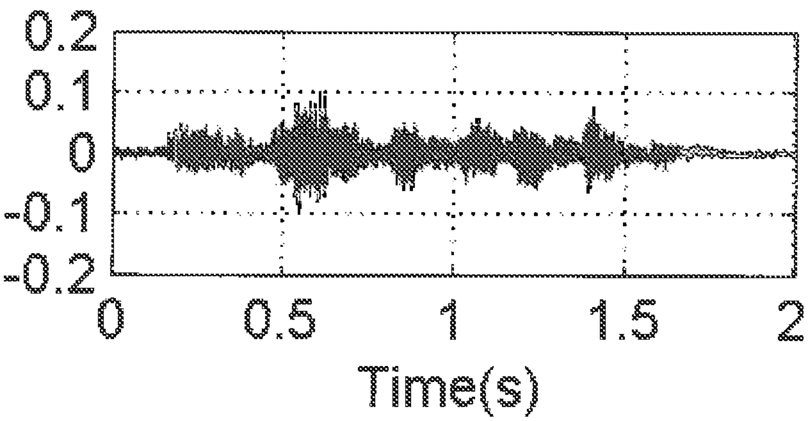
Figure 7B:
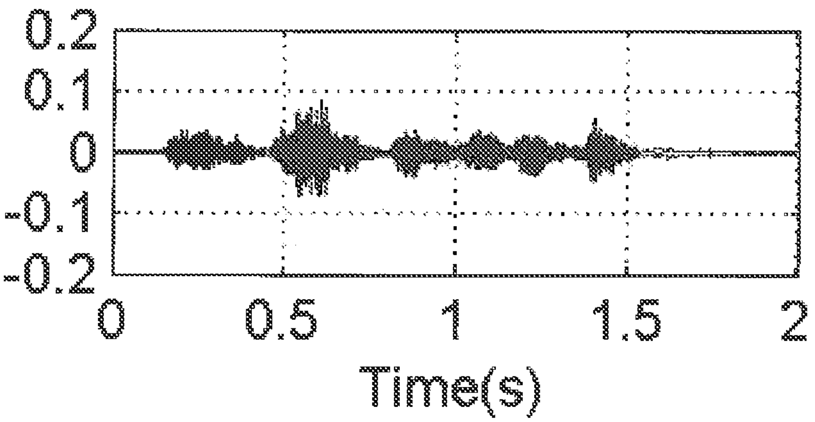
Figure 7C:
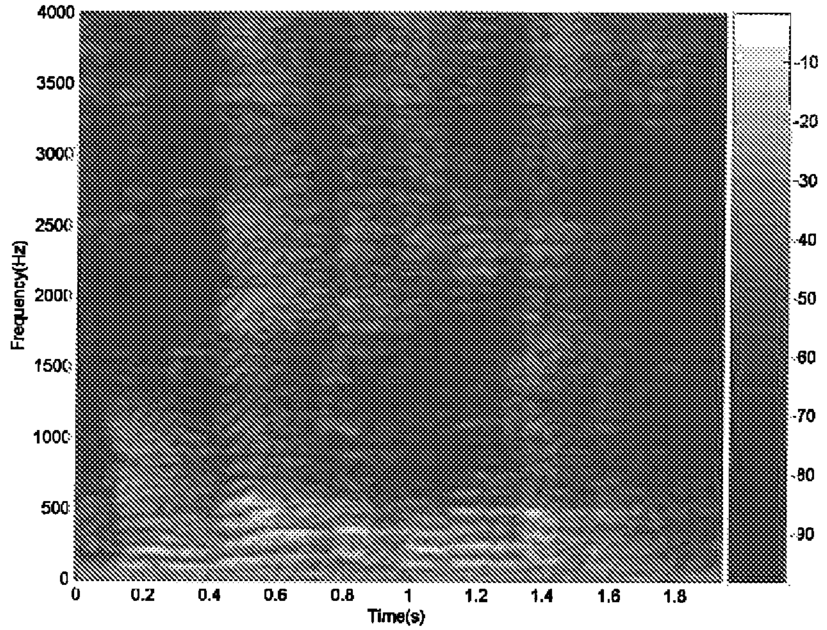
Figure 7D:
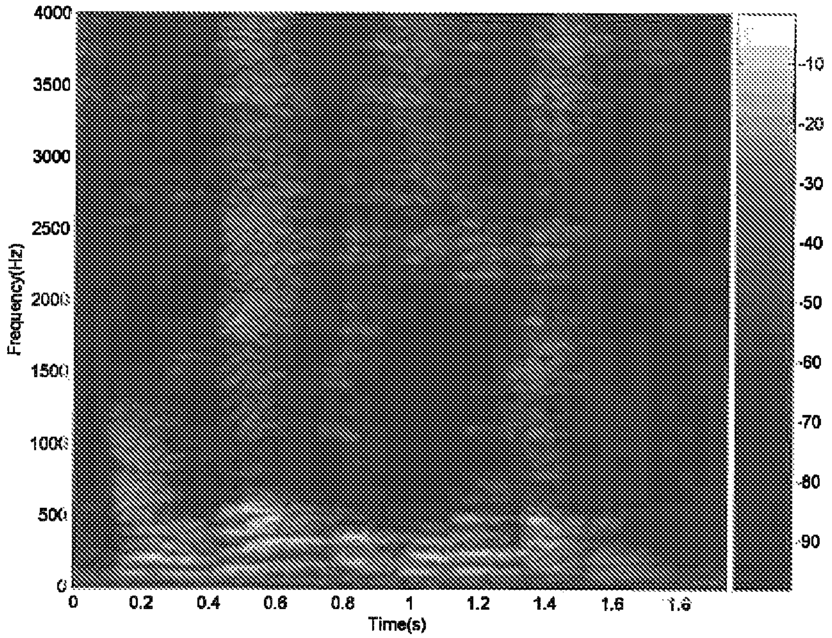

FIG. 7*a* is a diagram showing the time domain of the primary mic input signal in an embodiment of the present invention; FIG. 7*b* is a diagram showing the time domain of the primary mic after removal of reverberation in an embodiment of the present invention; FIG. 7*c* is a diagram showing the speech spectrum of the primary mic input signal in an embodiment of the present invention; and FIG. 7*d* is a diagram showing the speech spectrum of the primary mic after removal of reverberation in an embodiment of the present invention.

Referring to FIGS. 7*a*-7*d*, in this embodiment, when the primary and secondary mics face the sound source directly, the vertical distance from the sound source to the double mics is 2 m, and the distance between the primary and secondary mics is 18 cm, $C_{50}$ of the primary mic input signal before removal of reverberation is 6.8 dB. Using the scheme shown in FIG. 4, $C_{50}$ after removal of reverberation is 10.5 dB. As can be seen, by means of the scheme of the present invention, $C_{50}$ is increased by 3.7 dB.

FIG. 8 is a diagram showing the composition and structure of a device for reducing voice reverberation based on double mics in an embodiment of the present invention, which frame-by-frame processes the signals received by a primary mic and a secondary mic. Referring to FIG. 8, the device comprises: a reverberation spectrum estimation unit 700 and a spectral subtraction unit 800, wherein:

the reverberation spectrum estimation unit 700 is for receiving a primary mic input signal and a secondary mic input signal; calculating a transfer function h(t) from the secondary mic to the primary mic according to the primary mic input signal and the secondary mic input signal, obtaining a tail section $h_r(t)$ of the transfer function h(t), judging the strength of reverberation according to the transfer function h(t), calculating a regulatory factor β of a gain function to output it to the spectral subtraction unit 800, obtaining a late reverberation estimation signal of the primary mic input signal with the convolution of the secondary mic input signal and $h_r(t)$, converting the late reverberation estimation signal of the primary mic input signal from time domain to frequency domain to obtain a late reverberation spectrum of the primary mic input signal and output it to the spectral subtraction unit 800;

the spectral subtraction unit 800 is for receiving the primary mic input signal and the regulatory factor β of the gain function output by the reverberation spectrum estimation unit 700 as well as the late reverberation spectrum of the primary mic input signal, converting the primary mic input signal from time domain to frequency domain to obtain a frequency spectrum of the primary mic input signal, calculating the gain function according to the frequency spectrum of the primary mic input signal, the regulatory factor β of the gain function and the late reverberation spectrum of the primary mic input signal, using the frequency spectrum of the primary mic input signal to multiply by the gain function to obtain a reverberation-removed frequency spectrum of the primary mic input signal, converting the reverberation-removed frequency spectrum of the primary mic input signal from frequency domain to time domain to obtain a reverberation-removed time domain signal of the primary mic input signal, and outputting a reverberation-removed continuous signal of the primary mic input signal after frame-by-frame overlapping and summing the reverberation-removed time domain signal of the primary mic input signal.

In one embodiment of the present invention, after obtaining a late reverberation estimation signal of the primary mic input signal with the convolution of the secondary mic input signal and $h_r(t)$, the reverberation spectrum estimation unit 700 firstly frequency compensates the late reverberation estimation signal of the primary mic input signal and then coverts the frequency compensated signal from time domain to frequency domain to obtain a late reverberation spectrum of the primary mic input signal, and finally outputs it to the spectral subtraction unit 800.

FIG. 9 is a schematic diagram showing the detailed composition and structure of a device for reducing voice reverberation based on double mics and the input and output thereof in a preferred embodiment of the present invention. Referring to FIG. 9, the device for reducing voice reverberation based on double mics comprises a reverberation spectrum estimation unit 91 and a spectral subtraction unit 92, wherein the reverberation spectrum estimation unit 91 comprises: a transfer function calculation unit 911, a transfer function tail section calculation unit 912, a reverberation strength judgment unit 913, a late reverberation estimation unit 914, a frequency compensation unit 915 and a first time-frequency conversion unit 916; and the spectral subtraction unit 92 comprises: a second time-frequency conversion unit 921, a gain function calculation unit 922, a reverberation removing unit 923, a frequency-time conversion unit 924 and an overlapping unit 925.

The transfer function calculation unit 911 is for receiving a primary mic input signal and a secondary mic input signal, calculating a transfer function h(t) from the secondary mic to the primary mic according to the primary mic input signal and the secondary mic input signal, and outputting the transfer function h(t) to the transfer function tail section calculation unit 912 and the reverberation strength judgment unit 913.

The transfer function tail section calculation unit 912 is for obtaining a tail section $h_r(t)$ of the transfer function h(t) and outputting it to the late reverberation estimation unit 914. The transfer function tail section calculation unit 912 specifically takes a boundary point between early reverberation and late reverberation on the time axis of the transfer function h(t) and sets the values of the transfer function h(t) before the boundary point to be 0, thereby obtaining a tail section $h_r(t)$ of the transfer function h(t).

The reverberation strength judgment unit 913 is for judging the strength of reverberation according to the transfer function h(t), calculating a regulatory factor β of the gain function, and output it to the gain function calculation unit. Specifically, the reverberation strength judgment unit 913 calculates the parameter ρ indicating the strength of reverberation according to the aforementioned formula (5).

Namely, $$\rho = 10\log\frac{\int_0^T h^2(t)\,dt}{\int_T^\infty h^2(t)\,dt}\text{dB},$$

where h(t) is transfer function from the secondary mic to the primary mic, and T is designated boundary point on the time axis of h(t).

Then, the reverberation strength judgment unit 913 calculates the regulatory factor β of the gain function according to the aforementioned formula (6).

Namely, $$\beta = \begin{cases} 0 & \rho > \rho_1 \\ 2(\rho_1 - \rho)/(\rho_1 - \rho_2) & \rho_2 < \rho < \rho_1 \\ 2 & \rho < \rho_2 \end{cases},$$

where $\rho_1$ and $\rho_2$ are predetermined values. For example, $\rho_1$ is 9 dB, and $\rho_2$ is 2 dB (the distance between mics is 6 cm).

The late reverberation estimation unit 914 is for receiving the secondary mic input signal, obtaining a late reverberation estimation signal of the primary mic input signal with the convolution of the secondary mic input signal and $h_r(t)$, and outputting it to the frequency compensation unit 915.

The frequency compensation unit 915 is for frequency compensating the late reverberation estimation signal of the primary mic input signal, and outputting the frequency compensated signal to the first time-frequency conversion unit 916. The greater the distance between the primary mic and the secondary mic is, the less the degree of frequency compensation by the frequency compensation unit 915 to the late reverberation estimation signal of the primary mic input signal is.

The first time-frequency conversion unit 916 is for converting the frequency compensated late reverberation estimation signal of the primary mic input signal from time domain to frequency domain to obtain a late reverberation spectrum of the primary mic input signal, and outputting it to the gain function calculation unit 922.

The second time-frequency conversion unit 921 is for receiving the primary mic input signal, converting it from time domain to frequency domain to obtain a frequency spectrum of the primary mic input signal, and output it to the gain function calculation unit 922 and the reverberation removing unit 923.

The gain function calculation unit 922 is for calculating a gain function according to the frequency spectrum output by the second time-frequency conversion unit 921, the regulatory factor β of the gain function output by the reverberation strength judgment unit 913 and the late reverberation spectrum of the primary mic input signal output by the first time-frequency conversion unit 916, and outputting the gain function to the reverberation removing unit 923. The gain function calculation unit 922 may calculate the gain function G(l,k) according to the aforementioned formula (10).

Namely, $$G(l,k)=\sqrt{\frac{|X_2(l,k)|^2-\beta|\hat{R}(l,k)|^2}{|X_2(l,k)|^2}},$$

where l is frame number, k is frequency point number, β is regulatory factor of the gain function, $\hat{R}$ is late reverberation spectrum of the primary mic input signal, and $X_2$ is frequency spectrum of the primary mic input signal.

The reverberation removing unit 923 is for using the frequency spectrum of the primary mic input signal to multiply by the gain function to obtain a reverberation-removed frequency spectrum of the primary mic input signal, and output it to the frequency-time conversion unit 924. In this embodiment, the reverberation removing unit 923 calculates the reverberation-removed frequency spectrum D(l,k) of the primary mic input signal according to the aforementioned formula (11).

Namely, $D(l,k)=G(l,k)\cdot|X_2(l,k)|\cdot\exp(j\cdot\text{phase}(l,k))$, where l is frame number, k is frequency point number, $|X_2(l,k)|$ is amplitude of the primary mic input signal, G(l,k) is gain function, and phase(l,k) is phase of the primary mic input signal.

The frequency-time conversion unit 924 is for converting the reverberation-removed frequency spectrum of the primary mic input signal from frequency domain to time domain to obtain reverberation-removed time domain signal of the primary mic input signal, and output it to the overlapping and summing unit 925.

The overlapping and summing unit 925 is for frame-by-frame overlapping and summing the time domain signal output by the frequency-time conversion unit 924 to obtain a reverberation-removed continuous signal of the primary mic input signal.

To sum up, the device for reducing voice reverberation based on double mics frame-by-frame processes the signals received by a primary mic and a secondary mic. The reverberation spectrum estimation unit of the device is for receiving a primary mic input signal $x_2(t)$ and a secondary mic input signal $x_1(t)$; calculating a transfer function h(t) from the secondary mic to the primary mic according to $x_2(t)$ and $x_1(t)$, obtaining a tail section $h_r(t)$ of h(t), judging the strength of reverberation according to h(t), calculating a regulatory factor β of gain function to output it to the spectral subtraction unit of the device, obtaining a late reverberation estimation signal $\hat{r}(t)$ of $x_2(t)$ with the convolution of $x_1(t)$ and $h_r(t)$, converting $\hat{r}(t)$ from time domain to frequency domain to obtain a late reverberation spectrum $\hat{R}$ of $x_2(t)$ and output it to the spectral subtraction unit of the device. The spectral subtraction unit of the device is for converting $x_2(t)$ from time domain to frequency domain to obtain a frequency spectrum of $x_2(t)$, calculating a gain function according to the frequency spectrum of $x_2(t)$, β and $\hat{R}$, using the frequency spectrum of $x_2(t)$ to multiply by the gain function to obtain a reverberation-removed frequency spectrum of $x_2(t)$, converting from frequency domain to time domain to obtain a reverberation-removed time domain signal of $x_2(t)$. In this scheme of the present invention, by means of obtaining a late reverberation estimation signal $\hat{r}(t)$ of the primary mic input signal $x_2(t)$ with the convolution of the secondary mic input signal $x_1(t)$ and $h_r(t)$, and then subtracting the late reverberation estimation spectrum $\hat{R}$ of the primary mic input signal from the frequency spectrum of the primary mic input signal $x_2(t)$ by spectral subtraction method, the late reverberation can be effectively removed from the input signal $x_2(t)$ of the primary mic while retaining its early reverberation, which improves the voice quality. Meanwhile, in the present invention, in the estimation of late reverberation, the intensity of spectral subtraction is adjusted according to the strength of the reverberation, less or even no spectral subtraction is made when the reverberation is weak, which ensures that the voice will not be damaged and the voice quality is protected on the condition that the reverberation is weak and the voice intelligibility is originally high. In addition, this scheme does not require accurate estimation of DOA of direct sound, and therefore, it does not require the mics to have high consistency, and the acoustic design is not strictly limited.

As can be seen, by means of the technical scheme of the present invention, voice is effectively protected while removing reverberation, the strength of reverberation in the room can be automatically estimated, right treatment is selected according to different environments, and therefore, near-optimal voice quality is achieved. Additionally, there is no strict restriction on the mic consistency and the acoustic design, so its application is more flexible and convenient.

The foregoing is only a preferred embodiment of the present invention, and it is not used for limiting the protection scope of the present invention. Any modification, equivalent replacement and improvement within the spirit and principles of the present invention should be included in the protection scope of the present invention.

The invention claimed is:

1. A method for reducing voice reverberation based on double microphones, characterized in that the method comprises:

receiving a primary microphone input signal and a secondary microphone input signal, which are processed frame-by-frame as follows:

calculating a transfer function h(t) from the secondary microphone to the primary microphone according to the primary microphone input signal and the secondary microphone input signal;

obtaining a tail section $h_r(t)$ of the transfer function h(t), judging the strength of reverberation according to the transfer function h(t) and calculating a regulatory factor β of a gain function;

obtaining a late reverberation estimation signal of the primary microphone input signal with the convolution of the secondary microphone input signal and $h_r(t)$;

converting the late reverberation estimation signal of the primary microphone input signal from time domain to frequency domain to obtain a late reverberation spectrum of the primary microphone input signal; converting the primary microphone input signal from time domain to frequency domain to obtain a frequency spectrum of the primary microphone input signal;

calculating the gain function according to the frequency spectrum of the primary microphone input signal, the regulatory factor β of the gain function and the late reverberation spectrum of the primary microphone input signal;

using the frequency spectrum of the primary microphone input signal to multiply by the gain function to obtain a reverberation-removed frequency spectrum of the primary microphone input signal;

converting the reverberation-removed frequency spectrum of the primary microphone input signal from frequency domain to time domain to obtain a reverberation-removed time domain signal of the primary microphone input signal;

outputting a reverberation-removed continuous signal of the primary microphone input signal after frame-by-frame overlapping and summing the reverberation-removed time domain signal of the primary microphone input signal.

2. The method of claim 1, characterized in that after obtaining a late reverberation estimation signal of the primary microphone input signal and before converting from time domain to frequency domain, the method further comprises:

frequency compensating the late reverberation estimation signal of the primary microphone input signal, wherein the greater the distance between the primary microphone and the secondary microphone is, the less the degree of frequency compensation to the late reverberation estimation signal of the primary microphone input signal is; and converting the frequency compensated signal from time domain to frequency domain to obtain a late reverberation spectrum of the primary microphone input signal.

3. The method of claim 1, characterized in that judging the strength of reverberation according to the transfer function h(t) specifically is calculating parameter β indicating the strength of reverberation according to the following formula:

$$\rho = 10\log\frac{\int_0^T h^2(t)\,dt}{\int_T^\infty h^2(t)\,dt}\,\text{dB}$$

where h(t) is transfer function from the secondary microphone to the primary microphone, and T is designated boundary point on the time axis of h(t).

calculating a regulatory factor β of the gain function specifically is calculating according to the following formula:

$$\beta = \begin{cases} 0 & \rho > \rho_1 \\ 2(\rho_1 - \rho)/(\rho_1 - \rho_2) & \rho_2 < \rho < \rho_1 \\ 2 & \rho < \rho_2 \end{cases}$$

where $\rho_1$ and $\rho_2$ are predetermined values.

4. The method of claim 1, characterized in that calculating a gain function according to the frequency spectrum of the primary microphone input signal, the regulatory factor β of the gain function and the late reverberation spectrum of the primary microphone input signal specifically is calculating a gain function G(l,k) according to the following formula:

$$G(l,k) = \sqrt{\frac{|X_2(l,k)|^2 - \beta|\hat{R}(l,k)|^2}{|X_2(l,k)|^2}}$$

where l is frame number, k is frequency point number, β is regulatory factor of the gain function, $\hat{R}$ is late reverberation spectrum of the primary microphone input signal, and $X_2$ is frequency spectrum of the primary microphone input signal.

5. The method of claim 1, characterized in that acquiring a tail section $h_r(t)$ of the transfer function h(t) comprises: taking a boundary point between the early reverberation and the late reverberation on the time axis of the transfer function h(t), and setting the value of the transfer function h(t) before the boundary point to be 0, thereby obtaining the tail section $h_r(t)$ of the transfer function h(t).

6. A device for reducing voice reverberation based on double microphones, characterized in that the device frame-by-frame processes the signals received by a primary microphone and a secondary microphone, the device comprising: a reverberation spectrum estimation unit and a spectral subtraction unit, wherein:

the reverberation spectrum estimation unit is for receiving a primary microphone input signal and a secondary microphone input signal; calculating a transfer function h(t) from the secondary microphone to the primary microphone according to the primary microphone input signal and the secondary microphone input signal, obtaining a tail section $h_r(t)$ of the transfer function h(t), judging the strength of reverberation according to the transfer function h(t), calculating a regulatory factor β of a gain function to output it to the spectral subtraction unit, obtaining a late reverberation estimation signal of the primary microphone input signal with the convolution of the secondary microphone input signal and $h_r(t)$, converting the late reverberation estimation signal of the primary microphone input signal from time domain to frequency domain to obtain a late reverberation spectrum of the primary microphone input signal and output it to the spectral subtraction unit;

the spectral subtraction unit is for receiving the primary microphone input signal and the regulatory factor β of the gain function output by the reverberation spectrum estimation unit as well as the late reverberation spectrum of the primary microphone input signal, converting the primary microphone input signal from time domain to frequency domain to obtain a frequency spectrum of the primary microphone input signal, calculating a gain function according to the frequency spectrum of the primary microphone input signal, the regulatory factor β of the gain function and the late reverberation spectrum of the primary microphone input signal, using the frequency spectrum of the primary microphone input signal to multiply by the gain function to obtain a reverberation-removed frequency spectrum of the primary microphone input signal, converting the reverberation-removed frequency spectrum of the primary microphone input signal from frequency domain to time domain to obtain a reverberation-removed time domain signal of the primary microphone input signal, and outputting a reverberation-removed continuous signal of the primary microphone input signal after frame-by-frame overlapping and summing the reverberation-removed time domain signal of the primary microphone input signal.

7. The device of claim 6, characterized in that the reverberation spectrum estimation unit comprises: a transfer function calculation unit, a transfer function tail section calculation unit, a reverberation strength judgment unit, a late reverberation estimation unit, and a first time-frequency conversion unit; in addition, the reverberation spectrum estimation unit further comprises a frequency compensation unit; the spectral subtraction unit comprises: a second time-frequency conversion unit, a gain function calculation unit, a reverberation removing unit, a frequency-time conversion unit and an overlapping and summing unit; wherein:

the transfer function calculation unit is for receiving a primary microphone input signal and a secondary microphone input signal, calculating a transfer function h(t) from the secondary microphone to the primary microphone according to the primary microphone input signal and the secondary microphone input signal, and outputting the transfer function h(t) to the transfer function tail section calculation unit and the reverberation strength judgment unit;

the transfer function tail section calculation unit is for obtaining a tail section $h_r(t)$ of the transfer function h(t) and outputting it to the late reverberation estimation unit;

the reverberation strength judgment unit is for judging the strength of reverberation according to the transfer function h(t), calculating the regulatory factor β of the gain function, and output it to the gain function calculation unit;

the late reverberation estimation unit is for receiving the secondary microphone input signal, obtaining a late reverberation estimation signal of the primary microphone input signal with the convolution of the secondary microphone input signal and $h_r(t)$, and outputting it to the frequency compensation unit;

the frequency compensation unit is for frequency compensating the late reverberation estimation signal of the primary microphone input signal, and outputting the frequency compensated signal to the first time-frequency conversion unit, wherein the greater the distance between the primary microphone and the secondary microphone is, the less the degree of frequency compensation to the late reverberation estimation signal of the primary microphone input signal is;

the first time-frequency conversion unit is for converting the frequency compensated late reverberation estimation signal of the primary microphone input signal from time domain to frequency domain to obtain a late reverberation spectrum of the primary microphone input signal, and output it to the gain function calculation unit;

the second time-frequency conversion unit is for receiving the primary microphone input signal, converting it from time domain to frequency domain to obtain a frequency spectrum of the primary microphone input signal, and output it to the gain function calculation unit;

the gain function calculation unit is for calculating the gain function according to the frequency spectrum of the primary microphone input signal output by the second time-frequency conversion unit, the regulatory factor β of the gain function output by the reverberation strength judgment unit and the late reverberation spectrum of the primary microphone input signal output by the first time-frequency conversion unit, and outputting the gain function to the reverberation removing unit;

the reverberation removing unit is for using the frequency spectrum of the primary microphone input signal to multiply by the gain function to obtain a reverberation-removed frequency spectrum of the primary microphone input signal, and outputting it to the frequency-time conversion unit;

the frequency-time conversion unit is for converting the reverberation-removed frequency spectrum of the primary microphone input signal from frequency domain to time domain to obtain a reverberation-removed time domain signal of the primary microphone input signal, and output it to the overlapping and summing unit; and the overlapping and summing unit is for outputting a reverberation-removed continuous signal of the primary microphone input signal after frame-by-frame overlapping and summing the reverberation-removed time domain signal of the primary microphone input signal.

8. The device of claim 7, characterized in that the reverberation strength judgment unit is for calculating parameter ρ indicating the strength of reverberation according to the following formula:

$$\rho = 10\log\frac{\int_0^T h^2(t)\,dt}{\int_T^\infty h^2(t)\,dt}\text{dB}$$

where h(t) is transfer function from the secondary microphone to the primary microphone, and T is designated boundary point on the time axis of h(t);

and then calculating regulatory factor β of the gain function according to the following formula:

$$\beta = \begin{cases} 0 & \rho > \rho_1 \\ 2(\rho_1 - \rho)/(\rho_1 - \rho_2) & \rho_2 < \rho < \rho_1 \\ 2 & \rho < \rho_2 \end{cases}$$

where $\rho_1$ and $\rho_2$ are predetermined values.

9. The device of claim 7, characterized in that the gain function calculation unit is for calculating the gain function G(l,k) according to the following formula:

$$G(l, k) = \sqrt{\frac{|X_2(l, k)|^2 - \beta|\hat{R}(l, k)|^2}{|X_2(l, k)|^2}}$$

where l is frame number, k is frequency point number, β is regulatory factor of the gain function, $\hat{R}$ is late reverberation spectrum of the primary microphone input signal, and $X_2$ is frequency spectrum of the primary microphone input signal.

10. The device of claim 7, characterized in that the transfer function tail section calculation unit is specifically for taking a boundary point between early reverberation and late reverberation on the time axis of the transfer function h(t) and setting the values of the transfer function h(t) before the boundary point to be 0, thereby obtaining the tail section $h_r(t)$ of the transfer function h(t).

* * * * *